United States Patent Office 3,711,306
Patented Jan. 16, 1973

3,711,306
METHOD OF PRODUCING CEMENT
Naum Pinkhusovich Kogan, ulitsa Korolenko 9, kv. 22;
Otar Petrovich Mchedlov-Petrosyan, ulitsa Vorobieva
14, kv. 5; and Vladimir Ivanovich Satarin, viezd
Trinklera 5, kv. 16, all of Kharkov, U.S.S.R.
No Drawing. Filed May 9, 1969, Ser. No. 823,528
Int. Cl. C04b 7/02
U.S. Cl. 106—100  3 Claims

ABSTRACT OF THE DISCLOSURE

A method of producing cement comprising calcinating a raw mix at a temperature not higher than 1380° C. until the content of free lime in the clinker reaches 1.5–15% by weight, and subsequently grinding the obtained clinker with addition, depending on the content of free lime therein, to a degree of fineness determined by the formula $$S \geqslant 400 CaO_{free} + 2000 \text{ cm.}^2/\text{g.}$$

where $S$ = specific surface of cement, cm.$^2$/g.;
$CaO_{free}$ = content of free lime in the clinker.

---

The present invention relates to methods of cement production.

Known in the art are methods of cement manufacture which comprises calcinating the raw mix and then grinding the obtained clinker together with mineral additives.

In accordance with the universally adopted technology, the raw mix suitable chemically for producing portland cement is calcinated at a temperature of 1450–1500° C.

There is an opinion that the normally calcinated clinker should consist of the following main phases; tricalcium silicate (alite), dicalcium silicate (belite), tricalcium aluminate and tetracalcium aluminoferrite, the sum total of which usually reaches 96–98%. If this clinker contains more than 1.5–2% of chemically uncombined lime, the cement produced from such a clinker proves to be unsound.

The necessity for practically complete utilization of lime during calcination according to the adopted techniques of portland cement manufacture increases the consumption of heat for calcination, impairs the resistance of the refractory kiln lining and results in the production of hard-ground clinker.

At the same time it is known that introduction into cement of lime calcinated at a temperature not over 1200° C. does not lead to unsoundness of the hardening cement and contributes to its higher strength.

However, separate production of clinker and lime and their subsequent mixing does not meet the modern production requirements and is, in most cases, impracticable economically.

The main object of the invention is to provide a method of producing cement by an accelerated calcination process.

Another object is a reduction of the heat consumption required for calcination.

Still another object of the invention is to enhance the productivity of cement kilns.

Still another object of the invention is also an increase in the output of cement mills.

A further object of the invention is to improve the physical and mechanical properties of cement.

In compliance with these and other objects, the method of cement production, according to the invention, consists in calcinating a raw mix with a lime saturation factor not under 0.68 at a temperature not over 1380° C. until the free lime content in the clinker reaches 1.5–15% by weight after which the obtained clinker is ground with additives.

The calcination temperature depends upon the type of the raw mix and the content of additives in it.

The content of free lime in the clinker varies with the charging of the kiln with sludge, the time the material is kept in the kiln, and the quantity of fuel burnt.

By varying one or more of the above-mentioned factors the desirable content of free lime in the clinker can be obtained.

According to the present cement production method the raw mix is calcinated at a lower temperature and specific heat consumption than usual which rules out overcalcination of the lime and allows it to remain in the active state.

For producing quick-hardening cement it is practicable to use a raw mix with a lime saturation factor not below 0.8 and to calcinate it until the content of free lime in the clinker reaches not more than 7% by weight after which it should be ground with additives to a specific surface of not less than 3500 cm.$^2$/g.

In manufacturing slag portland cement and other special types of cement, the content of free lime in the clinker may reach 15% by weight.

If the lime saturation factor of the clinker is below 0.8, the cements obtained have a predominant amount of dicalcium silicate while at higher values of the saturation factor, the amount of tricalcium silicate is predominant.

For manufacturing slag portland cement it is practicable to grind the clinker with slag taken in an amount of 30–70% of the weight of the cement.

A higher content of active free lime in the clinker does not adversely affect the properties of cement provided the clinker is finely ground. This is attributable to the fact that such a lime reacts quickly with the gauging water.

The cements with a low lime saturation factor, corresponding mostly to the belite composition but containing active free lime are highly active binding agents.

The determination of free lime in the hydrated belite cements has revealed that lime is assimilated during hardening and that at the age of 28 days these cements contain 2–3 times less lime than the cement produced by a conventional method.

The advantages of the present method consist in a 5–7% reduction of specific heat consumption required for clinker calcination, in a 8–10% increase of the kiln output, a 20% increase of cement mill output and, in some cases, in the improvement of the physical and mechanical properties of the materials based on the cement produced by the claimed method.

Other objects and advantages of the present invention will become apparent from the detailed description of the invention that follows.

A raw mix with a saturation factor of 0.92 manufactured by the wet process is fed into a 150–m. kiln consuming gaseous fuel, the size of the charge being 10–15% larger than usual. The kiln runs at a constant rated thermal power of about 51.5 million Kcal./hr. and a speed of 1.2 r.p.m.

The increased charge results in a redistribution of technological zones in it, a reduced length of the sintering zone and a reduction of the calcination temperature down to 1360° C.

The presence of free lime in the clinker is attained by increasing the amount of raw material charged into the kiln, leaving the fuel consumption unchanged. The calcination temperature and the content of free lime in the clinker can also be regulated, apart from the method described above, by reducing the fuel consumption with unchanged charge, accelerating the kiln rotation speed, increasing the thermal power of the kiln and its charging, or by a combination of these methods.

Rapid cooling of the clinker in a conventional cooler (concentric or recuperative type, etc.) and a reduced temperature of calcination ensures the manufacture of loose-sintered easily ground clinker.

The clinker is ground in a mill 2.6 x 13 m. in size, with 4% gypsum added, to a specific surface determined by the formula:

$$S \geq 400 CaO + 2000 \text{ cm.}^2/\text{g.}$$

where $S$ = the specific surface of the cement, cm.$^2$/g.;
$CaO$ = content of free lime in clinker, weight percent.

The coefficient to be used before CaO should be determined for each type of clinker.

The results of the physical and mechanical tests of cement samples manufactured from mortars of hard and plastic consistency are summarized in Tables 1 and 2, respectively.

It can be seen from the tables, that the cements with a higher content of free lime display an activity of 500–600 kg./cm.$^2$.

What we claim is:

1. A method of producing cement comprising calcinating a raw mix with a lime saturation factor not under 0.68 at a temperature not higher than 1380° C. to form a clinker until the content of free lime in the clinker reaches 1.5–15% by weight, and subsequently grinding the clinker with additives, depending on the content of free lime therein, to a degree of fineness determined by the formula $$S \geq 400 CaO_{free} + 200 \text{ cm.}^2/\text{g.}$$

where $S$ = specific surface of cement, cm.$^2$/g.;
$CaO_{free}$ = content of free lime in the clinker.

2. A method as in claim 1, wherein the raw mix has a lime saturation factor not under 0.8 and is calcinated until the free lime content in the clinker is not over 7% by weight.

3. A method as in claim 1, wherein the clinker with the content of free lime of up to 15% is ground with slag taken in an amount of 30 to 70% of the cement weight.

TABLE 1

| Content of free CaO in clinker, percent | Specific surface, cm.$^2$/g. | Compressive strength, kg./cm.$^2$ | | | | Tensile strength, kg./cm.$^2$ | | |
|---|---|---|---|---|---|---|---|---|
| | | 1 day | 3 days | 7 days | 28 days | 3 days | 7 days | 28 days |
| Cement from marlaceous materials | | | | | | | | |
| 2.5 | 3,500 | 278 | 376 | 491 | 624 | 26.2 | 26.7 | 32.5 |
| 4.50 | 3,800 | 286 | 407 | 464 | 544 | 23.5 | 24.3 | 31.0 |
| Cement from artificial raw mix | | | | | | | | |
| 2.0 | 4,200 | | 448 | 532 | 559 | 24.9 | 25.8 | 32.2 |
| 2.0 | 4,300 | | 540 | 557 | 656 | 28.5 | 37.0 | 37.2 |
| 2.9 | 4,300 | | 478 | 620 | 660 | 27.7 | 28.8 | 40.0 |
| 4.72 | 4,500 | | 470 | 570 | 606 | 25.1 | 26.8 | 32.58 |

TABLE 2

| Content of free CaO in clinker, percent | Specific surface, cm.$^2$/g. | Compressive strength, kg./cm.$^2$ | | | Bending strength, kg./cm.$^2$ | | |
|---|---|---|---|---|---|---|---|
| | | 3 days | 7 days | 28 days | 3 days | 7 days | 28 days |
| Cement from marlaceous materials | | | | | | | |
| 4.50 | 4,200 | 383 | 481 | 580 | 55.3 | 69.2 | 76.6 |
| 4.50 | 3,800 | 354 | 458 | 596 | 51.8 | 65.1 | 75.5 |
| 2.50 | 3,500 | 362 | 448 | 557 | 53.3 | 69.0 | 73.5 |
| 2.50 | 3,500 | 386 | 467 | 575 | 59.3 | 71.6 | 80.4 |
| Cement from artificial raw mix | | | | | | | |
| 2.0 | 4,200 | 414 | 438 | 501 | 49.6 | 53.6 | 57.5 |
| 2.0 | 4,200 | 373 | 532 | 563 | 46.1 | 63.6 | 68.5 |
| 2.9 | 4,300 | 370 | 409 | 535 | 48.1 | 57.6 | 62.4 |
| 4.72 | 4,500 | 376 | 506 | 540 | 57.6 | 58.5 | 66.6 |

References Cited

UNITED STATES PATENTS

| | | | |
|---|---|---|---|
| 1,943,817 | 1/1934 | Dunton | 106—100 |
| 2,083,179 | 6/1937 | Work | 106—100 |
| 3,183,106 | 5/1965 | Frankert | 106—103 |

JAMES E. POER, Primary Examiner

U.S. Cl. X.R.

106—102, 103